Fig. 1.

Inventor
Paul E. Morgan
By His Attorney

Inventor
Paul E. Morgan
By His Attorney

Aug. 17, 1954 P. E. MORGAN 2,686,673
AUTOMATIC STACKING DEVICE
Filed July 7, 1949 10 Sheets-Sheet 5

Inventor
Paul E. Morgan
By His Attorney

Inventor
Paul E. Morgan
By His Attorney

Inventor
Paul E. Morgan
By His Attorney

Patented Aug. 17, 1954

2,686,673

UNITED STATES PATENT OFFICE 2,686,673

AUTOMATIC STACKING DEVICE

Paul E. Morgan, Melrose, Mass., assignor to United Shoe Machinery Corporation, Flemington, N. J., a corporation of New Jersey Application July 7, 1949, Serial No. 103,340

8 Claims. (Cl. 271—68)

This invention relates to machines for stacking flexible sheet material and more particularly to machines for stacking individual work pieces such as hides or skins, which work pieces must be individually and consecutively handled in spread-out condition for treatment.

When individual work pieces, such as hides or skins being treated in a tannery, are subjected to a number of operations to produce a desired product, considerable handling of each piece between operations is necessary and entails much labor, time and expense. A hide or skin is taken from the barrel-like body of an animal and it is difficult to handle because of its irregular contour and disinclination to lie flat or in spread-out condition on any supporting surface provided. Some pieces, such as whole hides or sides, are of such unwieldy length and weight that the labor involved in handled them manually is extremely arduous. All pieces should be stacked without forming creases or wrinkles and care exercised in this direction consumes time.

Some pieces, such as calfskins, are stacked in a "Standard" manner, i. e., they usually are relatively small pieces and each piece is received with a given side up and is deposited in a stack with that same side up.

Often it is desirable that work received with one side up be stacked with that side down and this type of stacking is termed herein as "Invert" stacking.

Sometimes it is desirable to stack hides or skins with adjacent pieces in grain side to grain side or flesh side to flesh side contact, i. e., with alternate pieces grain side up and the other pieces with the grain side down. The latter type of stacking is called "Marrying."

In the stacking on pallets of long pieces such as leather sides it is usually preferred to double each piece upon itself lightly and without folding or creasing. A number of such doubled-over pieces may be stacked with their doubled or looped ends all at one end or side of the stack and then it is desirable to reverse the stacking, i. e., the loose free ends of each of several subsequently handled and doubled-over pieces are placed over the looped ends of the number of pieces first stacked. In "Doubled" stacking there may be several such reversals in a given stack provided the weight of the stack is insufficient to damage the lower pieces. It is obvious that the reversals serve to maintain balance for the stack as the latter is formed on a horse, pallet or floor.

The requisite steps and precautions to be taken in the various ways of stacking of hides and skins in tanneries heretofore have been of such nature as not to be subject to performance by any mechanical instrumentalities. The sizes of work pieces to be handled and also the type of operation next to be performed upon the leather (after stacking) serve to determine whether the stacking should be "Standard," "Invert," "Marry" or "Doubled." A suitable machine must be versatile to meet such conditions.

It is an object of the present invention to provide a machine which will stack flexible sheet material such as spread-out hides or skins which are consecutively presented to one side or the front of the machine and which will do so regardless of the length of the work pieces and which will perform a desired stacking operation whether it be in the Standard, Invert, Marry or Doubled form.

In accordance with an important feature of the invention a novel delivery system for consecutively presented pieces of spread-out sheet material is provided which system leads from the front or work-receiving side of the machine and includes parallel runs of endless belts which discharge the sheet material in cycles and at such a rate and in such manner that substantially no undulations, creases or stresses are present in the material as deposited as part of a stack.

Another feature is a flexible conveyor belt of dielectric material, the belt having an electrically conductive material upon it which is instrumental in maintaining an electrical control circuit until interrupted by a dielectric work piece present on the belt.

Still another feature of the invention is a gripping device for a conveyor belt system comprising a resilient soft band of material adhering to the median line or longitudinal center of a belt to contact a work piece being conveyed or stacked and restrain it against undue displacement by gravity or other forces and to do so without creasing or folding it.

The above and other features of the invention, including various novel details of construction and combinations of parts will now be more particularly described by reference to the accompanying drawings and pointed out in the claims.

Figure 21:
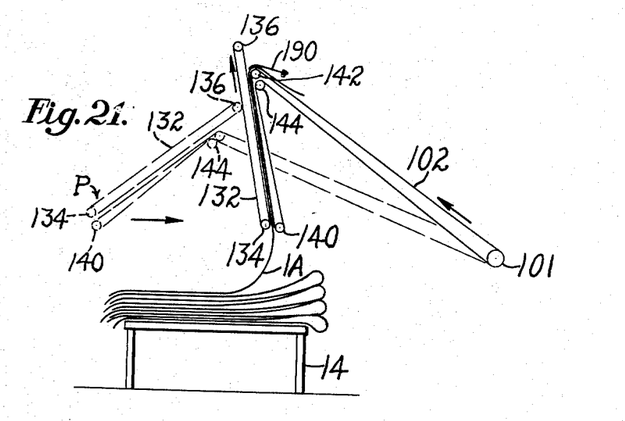
Figs. 21, 22 and 23 are diagrammatic showings of three stages of "doubled" stacking.

The machine, after receiving the work pieces consecutively presented to it, is adapted to deposit or stack those pieces on a floor 10 upon which the machine stands or upon a horse 12 (Fig. 1) or upon a pallet or table 14 (Fig. 21). The horse or pallet of course does not form a part of the present invention and is merely a suitable device upon which the work pieces may be placed by the stacking machine. In some cases it may be advisable to lower the horse or pallet as the stack increases in height.

Figure 1:
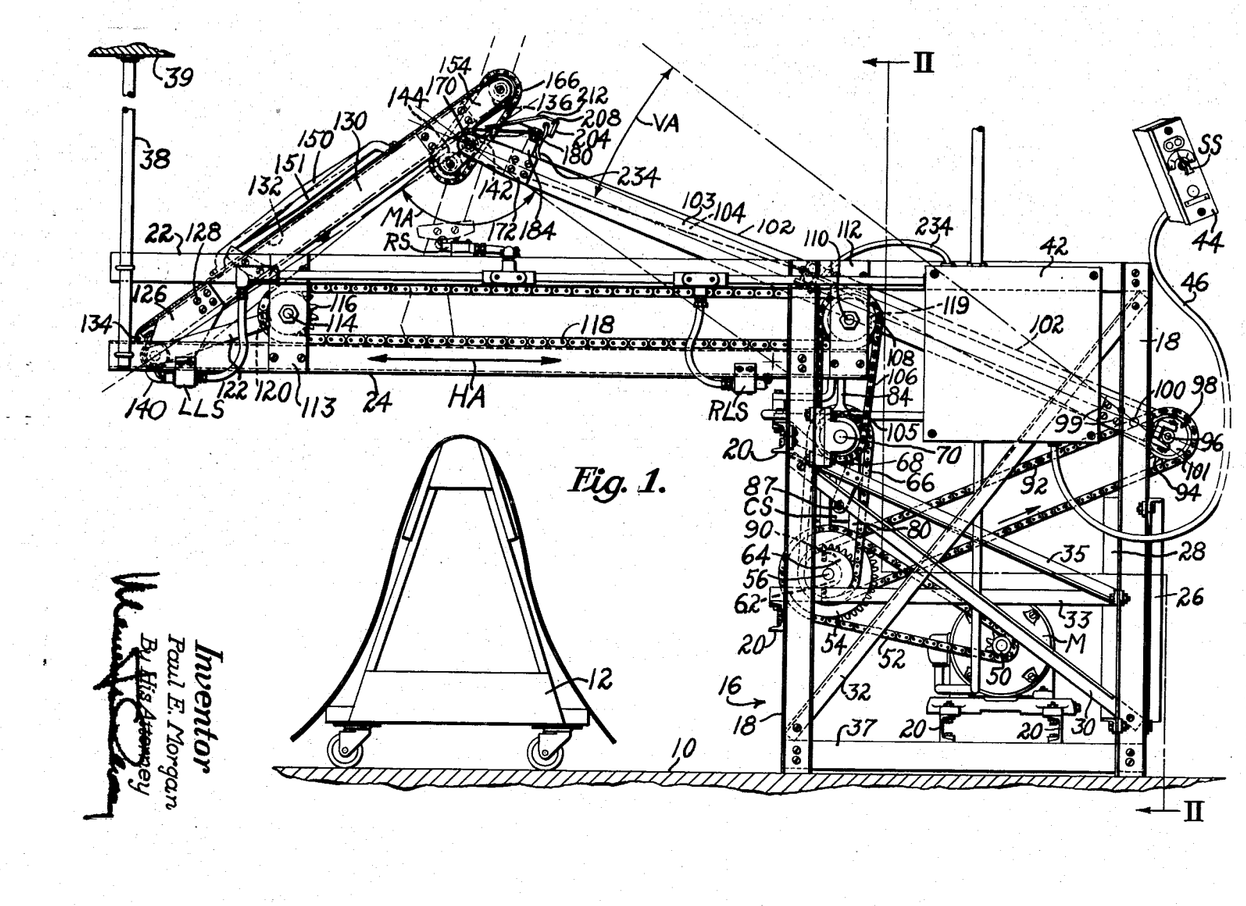
Fig. 1 is a left-side view of a stacking machine in which the present invention is embodied and a horse upon which sheet material may be received upon discharge from the stacking machine.
Figure 2:
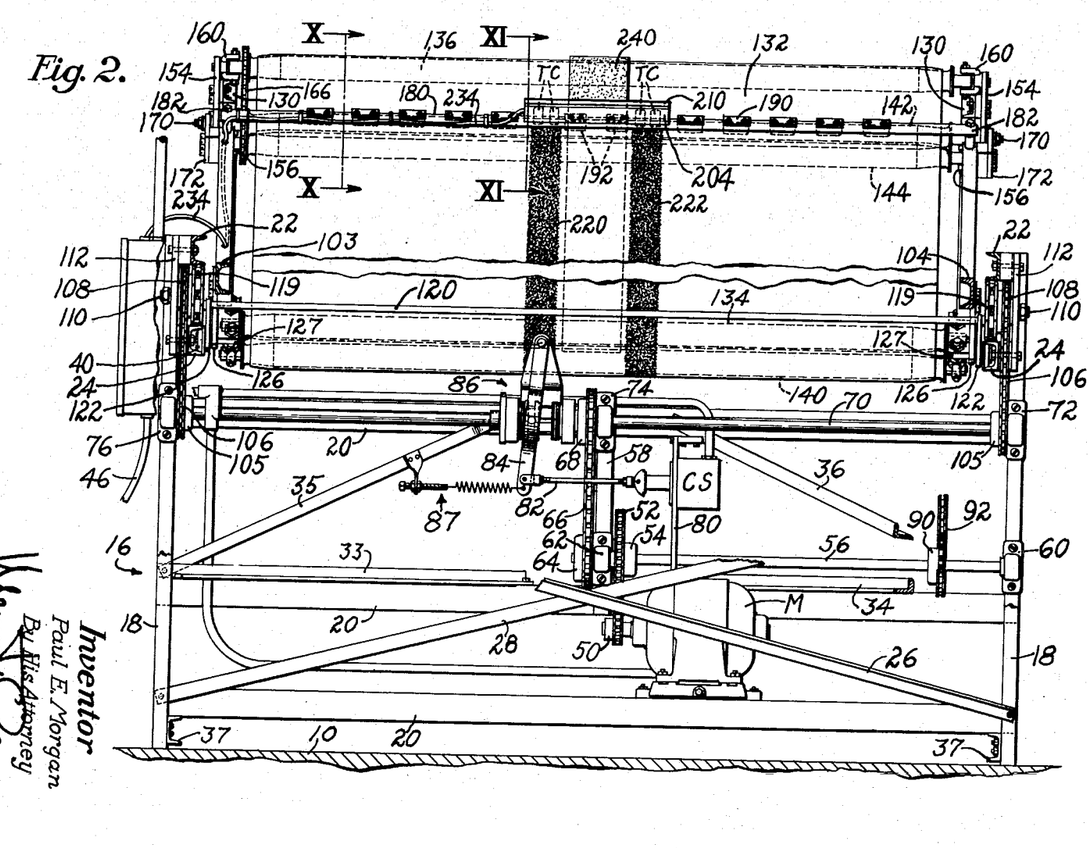
Fig. 2 is an elevational and sectional view along the line II—II of Fig. 1.

The machine in which the present invention is embodied comprises a frame 16 having four vertical stanchions 18 (Figs. 1 and 2), four transverse channel bars 20, two longitudinal or top channel bars 22 and two shorter longitudinal channel bars or horizontal tracks 24. Crossed angle bars 26, 28 (Fig. 2) are utilized at the front (lower part) of the machine to lend rigidity to the frame 16 in a transverse direction and each side of the frame is strengthened by inclined and crossed angle bars 30, 32 (Fig. 1). Additional angle bars 33 and 34 are placed horizontally and, together with downwardly inclined bars 35 and 36, lend additional rigidity. The base of the frame is strengthened at each side of the machine by channel bars 37 each of which is bolted to two of the upright stanchions 18. The rearmost portion of the machine frame is supported by vertical tubular members 38 (only one is shown in Fig. 1) which are attached to the ceiling 39 of the room in which the machine is installed.

Each of the two channel bars 24 at the rear of the machine is arranged to serve as a track for a flanged wheel 40 and these wheels are reciprocated in a horizontal plane to guide the movements in a straight path of the conveyor or delivery system of the machine as will be described hereinafter.

The electrical control means for the machine is automatic and for the most part is mounted on the left-hand side of the machine frame 16 in a closed box 42 and switches RS, RLS and LLS (Figs. 1 and 13) employed in the control circuits are mounted on the channel bars 22 and 24 on the left side of the machine. A control box 44 (Fig. 1) is provided upon which a selector switch SS is located and this control box 44 is connected to the circuits of box 42 by means of a conduit 46. It will be understood that the control box 44 may be mounted wherever found desirable and within easy access to the operator of the stacking machine or to the operator of the machine feeding or presenting the work pieces to the stacking machine.

A motor M is mounted at the bottom of the machine frame 16 on the two lowest transverse channel bars 20, and the motor shaft is provided with a sprocket 50 arranged to drive a chain 52 which passes over a large sprocket 54 keyed to a shaft 56. A vertical stiffening member 58 (Fig. 2) is attached to the centers of two of the transverse channel bars 20 and the shaft 56 is journaled in a bearing 60 attached to one vertical stanchion 18 and a second bearing 62 supported on the vertical member 58. A sprocket 64 is keyed to one end of the shaft 56 and is arranged to drive a chain 66 which passes over a sprocket 68 freely rotatable on a shaft 70 journaled in bearings 72, 74 and 76 mounted on the frame 16. A vertical plate 80 (Fig. 2) is mounted on the machine frame above and to the rear of the motor M and this plate serves as a support for a solenoid CS which is connected by a link 82 to the operating lever 84 of a conventional clutch 86. Parts of the clutch 86 are keyed to the shaft 70 and are adapted to drive the shaft 70 when the clutch is actuated by energization of the solenoid CS. A tensioning device 87 is connected to the angle bar 35 to keep the clutch drive inactive when the solenoid CS is deenergized.

The shaft 56 has a third sprocket (Fig. 2) keyed to it and this sprocket (sprocket 90) is arranged to drive a chain 92 which passes over a sprocket 94 (Fig. 1) mounted near the left end of, and keyed to, a shaft 96 at the front of the machine. Shaft 96 is held in adjustable bearing assemblages 98 (only one of which is shown in Fig. 1) supported on the two foremost stanchions 18 by means of pivot pins 100. The shaft 96 supports and rotates together with a conveyor belt roller 101 which is located transverse to the front of the machine and guides an endless conveyor belt 102 two runs of which operate between upwardly and rearwardly inclined channel bars or conveyor arms 103 and 104. Conveniently, each of the bearing assemblages 98 is attached by bolts 99 to a bar 103 or 104 and carries a pivot pin 100 extending through and journaled in a stanchion 18.

Figure 4:
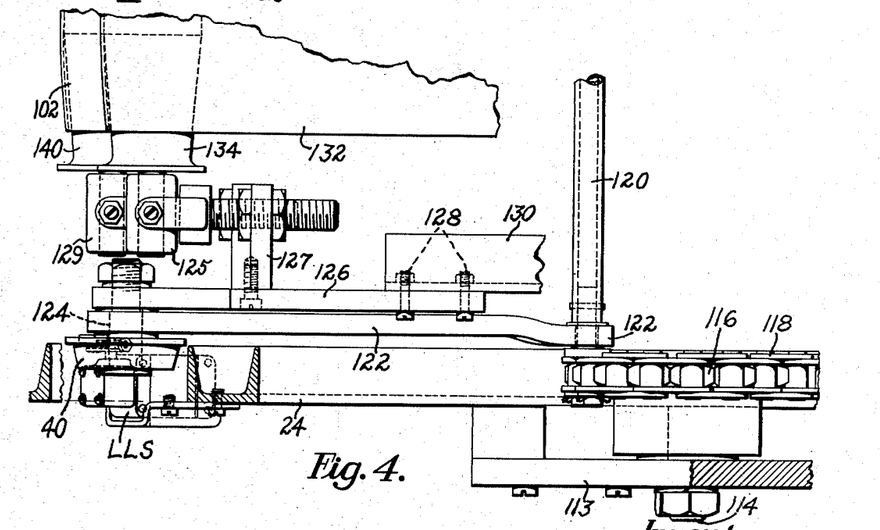
Fig. 4 is a view partially in section along the line IV—IV of Fig. 3.

Each end of the transverse shaft 70 has keyed to it a sprocket 105 which drives a chain 106 passing over a sprocket 108 which is rotatable on a stud shaft 110. Each shaft 110 is rigidly affixed to one of two vertical plates 112 bolted to the machine frame. Two similar vertical plates 113 (only one shown in Fig. 1) are rigidly attached to the machine frame farther to the rear, and each of these plates supports a stud shaft 114 and a sprocket 116. A chain 118 is arranged at each side of the machine to pass over a sprocket 116 and a sprocket 119 the latter having a common hub with one of the sprockets 108 to rotate therewith on one of the stub shafts 110. These chains 118 determine the range of horizontal movement of the discharge end of the delivery system as will further appear. A bar 120 (Fig. 4) is arranged to join the two chains 118, and a link 122 is pivoted near each end of the rod 120 and is journaled on one of the shafts 124 of the flange wheels 40.

Figure 3:
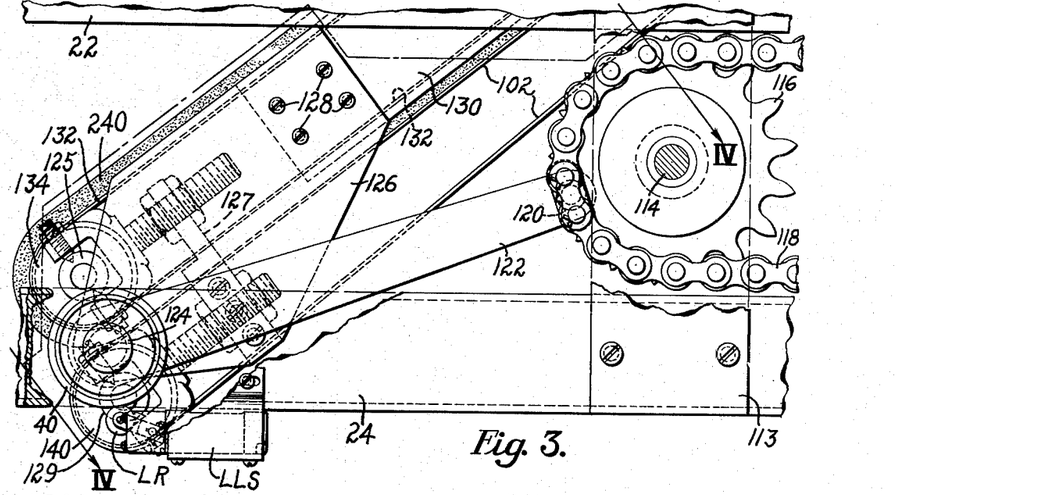
Fig. 3 is an enlarged detail and side view of the rear end of the conveyor system as shown in Fig. 1 and with some parts broken away.

A vertical plate 126 at each side of the machine is arranged to support a shaft 124 and its associated wheel 40, as well as a bearing bracket 127 (Figs. 3 and 4), and each plate 126 is bolted at 128 to one of the two channel bars or arms 130 inclined upwardly toward the front of the machine. These channel bars 130 serve as arms for supporting a rearmost endless conveyor belt 132 and its rollers 134 and 136 (herein termed a "second set" of rollers) as well as a portion of the conveyor belt 102 and its rollers 140, 142 and 144 (the latter three rollers together with roller 101 herein are termed a "first set" of rollers). Rollers 134 and 140 are supported in bearings 125 and 129 adjustably held in each bearing bracket 127. The two rear conveyor arms or channel bars 130 are joined together by crossed stiffening members or tubular bars 150 and 151 (Fig. 1) thereby forming a delivery arm. At the upper end of each arm 130 is bolted a plate 154 which serves as a carrying member for adjustable bearings 156, 158 and 160. Such bearings are used at each end of the rollers 144, 142 and 136 (see Fig. 2) as will be understood.

On the left side of the machine the rollers 136 and 144 are provided with sprockets 162 and 164 which are connected together by a chain 166. Concentric with and at each end of the roller 142 (Figs. 5 and 6) is a short shaft 170 which passes through its corresponding plate 154 and serves as a pivot for a corresponding plate 172 bolted to a channel bar 103 or 104 (103 on the left side of the machine and 104 on the right side of the machine).

Figure 5:
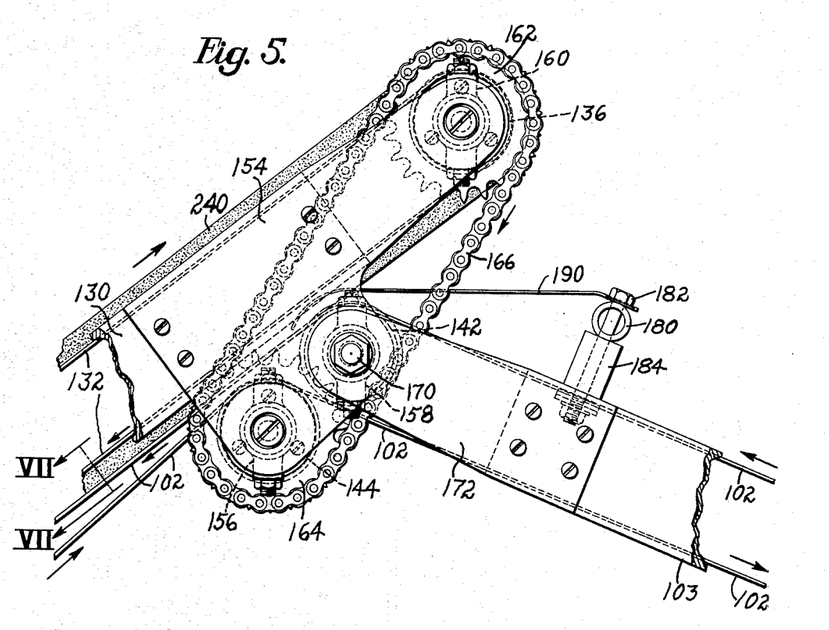
Fig. 5 is an enlarged detail and side view of part of the conveyor delivery system seen in Fig. 1.
Figure 6:
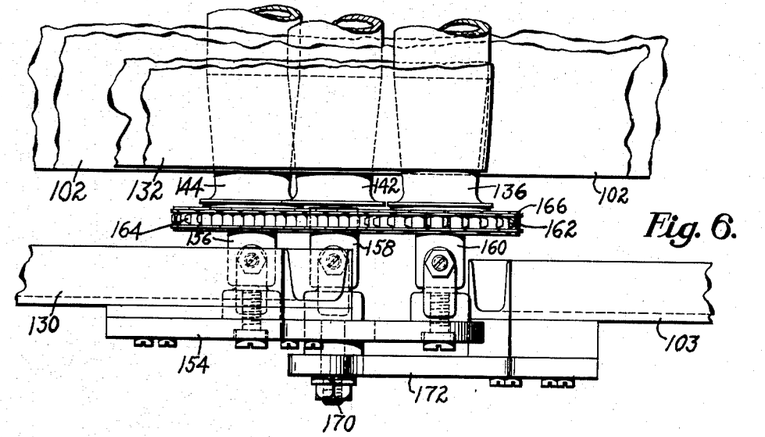
Fig. 6 is a plan view of one side of the conveyor system as depicted in Fig. 5.
Figure 7:
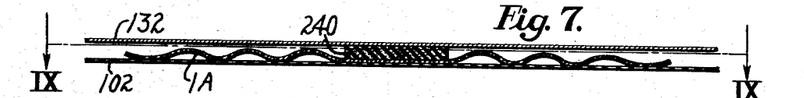
Fig 7 is a sectional view along the line VII—VII in Fig. 5, drawn to a slightly reduced scale.

A transverse tubular member 180 (Fig. 2) is attached to the two arms 103 and 104 by means of two bolts 182 (Fig. 5). The tubular member 180 is separated from each of the arms by a spacing block 184. Along the length of the tubular member 180 are fastened ten flexible and curved work guiding members 190. Two other flexible and curved work guiding members 192 are mounted in spaced relation on the tubular member 180 but they are located at approximately midway thereof. These members 192 are somewhat shorter than the members 190 for reasons which will appear. A block 200 of hard dielectric material is held by three screws 202 to the member 180 and is enclosed along its length by a flat piece 204 of similar dielectric material. The ends as well as the top of the block 200 are enclosed by pieces 206, 208, 210 and 212 of similar material such as a plastic composition.

Figure 12:
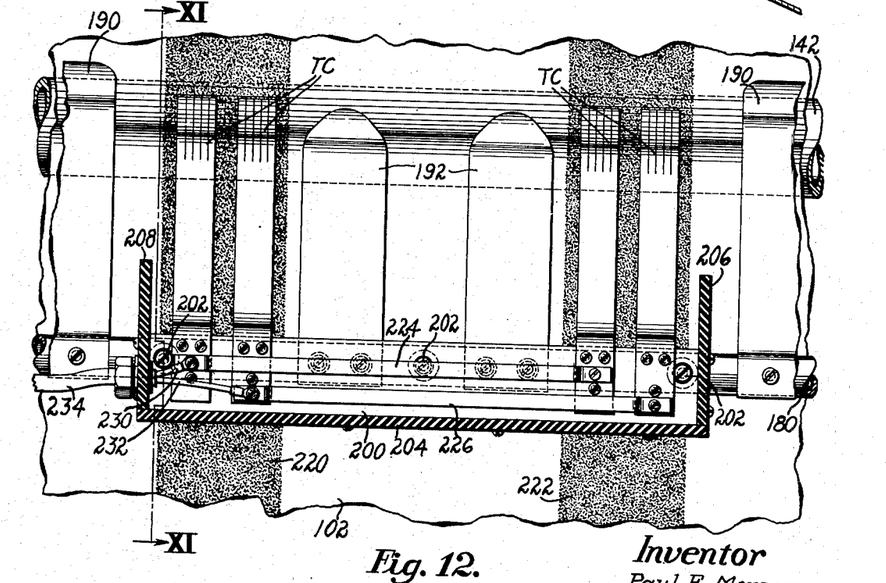
Fig. 12 is a plan view of the parts shown in Fig. 11 but with the topmost conveyor belt omitted and other parts in section.

Four flat and flexible metallic contact members TC are attached to the top of the dielectric block 200 by means of screws 214 in such manner as to be insulated from the tubular member 180 and these members are extended over the top of the belt 102 where the latter passes over the roller 142. The belt 102 is of dielectric material such as woven fabric or rubber composition, and two longitudinal portions 220 and 222 thereof (Figs. 2 and 12) are coated or impregnated with an electrically conductive substance such as copper or other material which may be applied in the form of a paint, the arrangement being such that two adjacent contacting members TC rest lightly on the copper coating of the portion 220 and the other two contacting members TC rest lightly on the copper coating of the area or portion 222. Conveniently and as preferred, molten copper is sprayed on the belts and, if the latter are fibrous, the copper anchors around the fibers. One conductor TC over the portion 220 is connected to one of the conductors TC of the portion 222 by a conductor bar 224 and the other two conductors TC are conducted together by a conductor bar 226. The conductor bar 224 is connected to the control circuits by a wire 230 (Figs. 12 and 13) and the conductor bar 226 is connected to those circuits by a wire 232. Both of these wires are enclosed in a conduit 234 which passes down and through the top flange of the channel bar 103 and into the control box 42.

Figure 8:
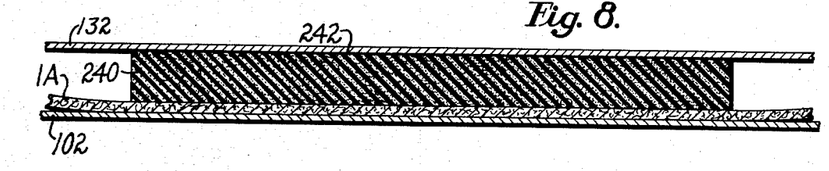
Fig. 8 is a portion of the view shown in Fig. 7 drawn to a larger scale.
Figure 9:
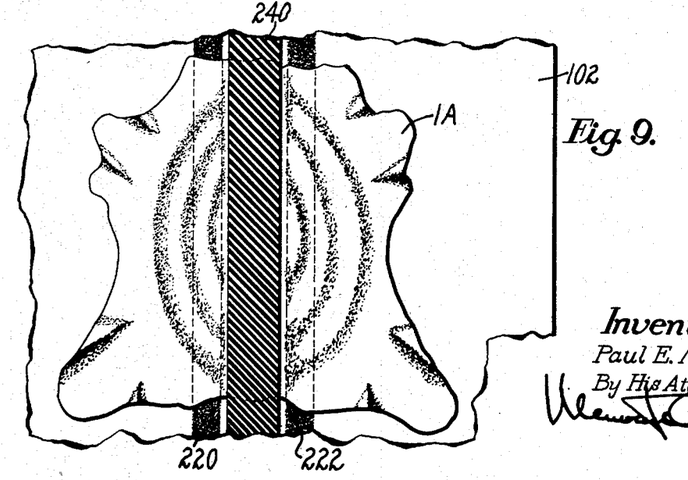
Fig. 9 is a sectional view along the line IX—IX of Fig. 7.
Figure 10:
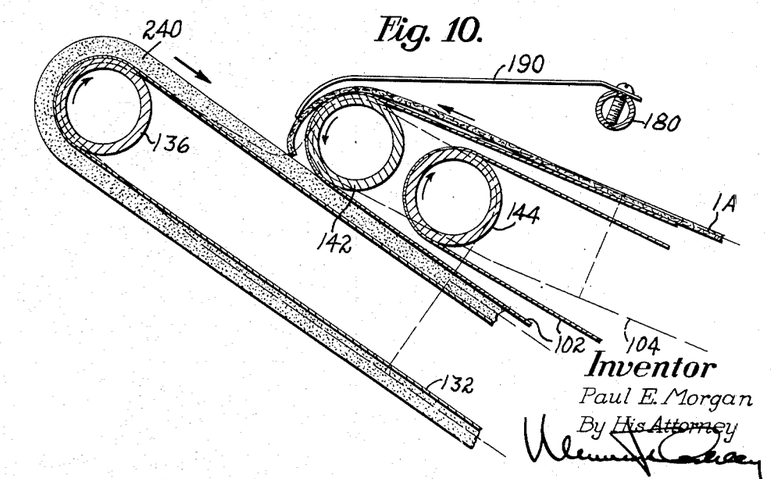
Fig. 10 is a sectional view along the line X—X of Fig. 2 but drawn to a larger scale and with the conveyor belts in slightly different positions.
Figure 11:
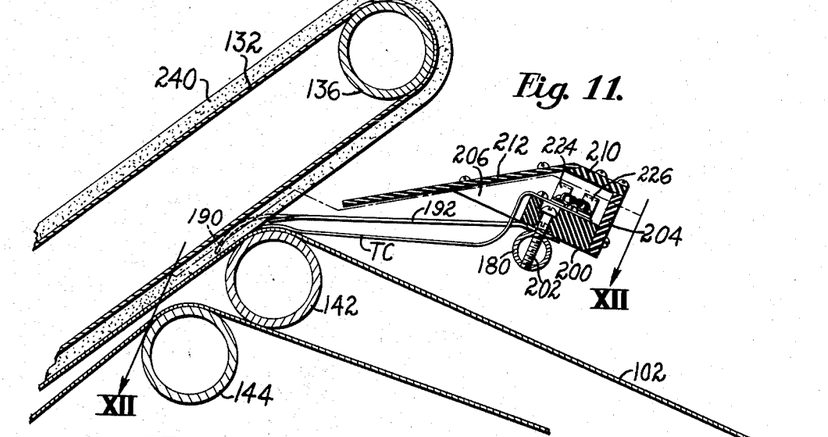
Fig. 11 is a sectional view along the line XI—XI in Figs. 2 and 12.

The endless conveyor belt 132 which leads from the roller 136 to the roller 134 and is supported and guided by those rollers is provided with a central and longitudinal layer or band 240 of soft, resilient and yieldable material such as sponge rubber. An adhesive 242 (Fig. 8) may be used to cause the band to adhere to the belt 132. A practical thickness for this flexible and soft layer in handling hides and skins is about one-half inch but this thickness is not critical. The thickness of this material necessitates the differences in length between the work guiding members 190 and 192. The members 192 are made of less length to clear the soft layer 240 but of sufficient length to aid the members 190 in preventing undesirable folding or doubling of the leading portions of each work piece as they are turned down to pass between the parallel, adjacent and downwardly inclined runs of the belts 102 and 132.

Disregarding the electric circuits and their operation and confining the description of the operation of the machine, at this time, to the mechanical aspects only, reference is again made to the fact that the function of the machine is to receive spread-out work pieces, such as hides or skins, as they are individually and consecutively presented to the machine manually or from a preceding work treating machine such as a wringer, splitter, dust remover or other machine and to stack them in a desired order. With the parts in the positions as shown in Fig. 1 and the machine assumed ready to receive consecutive work pieces from a preceding work-treating machine, the belts 102 and 132 are power driven on their rollers with the upper run of the belt 102 proceeding from the front of the machine and toward the rear and the lower run of the belt 132 also being driven toward the rear. Before receiving a work piece therefor the two endless belts are being driven continuously on their rollers and the rollers maintain their positions as shown in Fig. 1—i. e.—without the delivery conveyor belt system oscillating or swinging or the rollers bodily moving. After a work piece 1A is placed upon the belt 102 in spread-out condition, that work piece is conveyed upwardly to the zone of the upper unit of rollers (rollers 136, 142 and 144) and the leading edge thereof is guided by the members 190 and 192 to pass down between the parallel and adjacent runs of the belts 102 and 132 without objectionable creasing or folding. The sets of contacts TC are connected in parallel in the electrical control circuit leading through the conduit 234 and when the leading edge of the work piece is interposed between them and the conductive coating on the belt 102, the electric timing circuits come into operation as will be described hereinafter. Mechanically speaking, however, the leading edge of the work piece 1A passes downwardly between the parallel runs of the belts 102 and 132 and is suspended from between the two rollers 134 and 140 for a period (determined by the timing circuits) at which time the leading edge is in proper position for deposit on the floor 10, horse 12 or pallet 14. When this situation has come about the chains 118 begin to function (travel about their supporting sprockets) and the rear arms 130 of the delivery arm with the belt 132 are actuated by the links 122 and begin to swing to the left from their positions as viewed in Fig. 1 and in accordance with the arrow MA about the shafts 170 as pivots. The length of horizontal travel of the chains 118 determines the range of movement of the links 122 and therefore of the discharge end of the delivery system to which the links are attached. Simultaneous with the collective oscillation of the discharge end of the delivery arm or conveyor system, the infeed portion of the belt 102, together with the arms 103 and 104, swings about the pivot pins 100 as centers and moves upwardly along the arc VA. As a consequence of these swinging motions the lower ends of the parallel runs of belts 102 and 132 collectively move to the right and in a substantially straight path the direction of which is indicated by the arrow HA.

The sprockets and chain drives are so proportioned that the rate of travel or velocity of the two endless belts with respect to their own pulleys is substantially the same as the rate of travel or velocity of the lower ends of the adjacent and parallel runs of the belts 102 and 132 in the horizontal or straight path. The work piece 1A is therefore deposited without pulling it along the surface which is to support it and without wrinkling or creasing it.

For a lengthy work piece it may be necessary for the delivery arm to swing both ways as shown by the arrow HA in Fig. 1 before the complete work piece is deposited and in which case the piece is doubled on itself ("Doubling") as will further appear. It is apparent that the machine permits a given cycle of operation or effective oscillation of the delivery arm to begin or be terminated at either end of its range of travel.

For small work pieces each piece may be completely deposited in one swing of the delivery arm over the place of deposit and the return swing of the delivery arm may be merely a step of preparation to receive the next piece. This aspect of the matter is more fully explained hereinafter in describing the operation of the electrical control circuits.

When the work piece 1A is passing downwardly and between the oscillating and parallel belt runs there may be a tendency for some pieces which are flimsy, very soft or extremely flexible, to slide or be unduly displaced from their proper locations with respect to the belts. Such displacement, if appreciable or considerable, would necessarily interfere with proper stacking. The band 240 of soft material is particularly effective in preventing such displacement. It contacts each hide or skin where the latter is usually most loose or baggy and engages each piece with only sufficient friction to hold it in place. The holding is done without danger of damage to the work and contributes much to the smoothness experienced in the machine operation. Creases or folds would be ironed into the leather pieces in some instances if the bulging (not flat) leather were closely confined between belts without the aid of the band 240.

Figure 13:
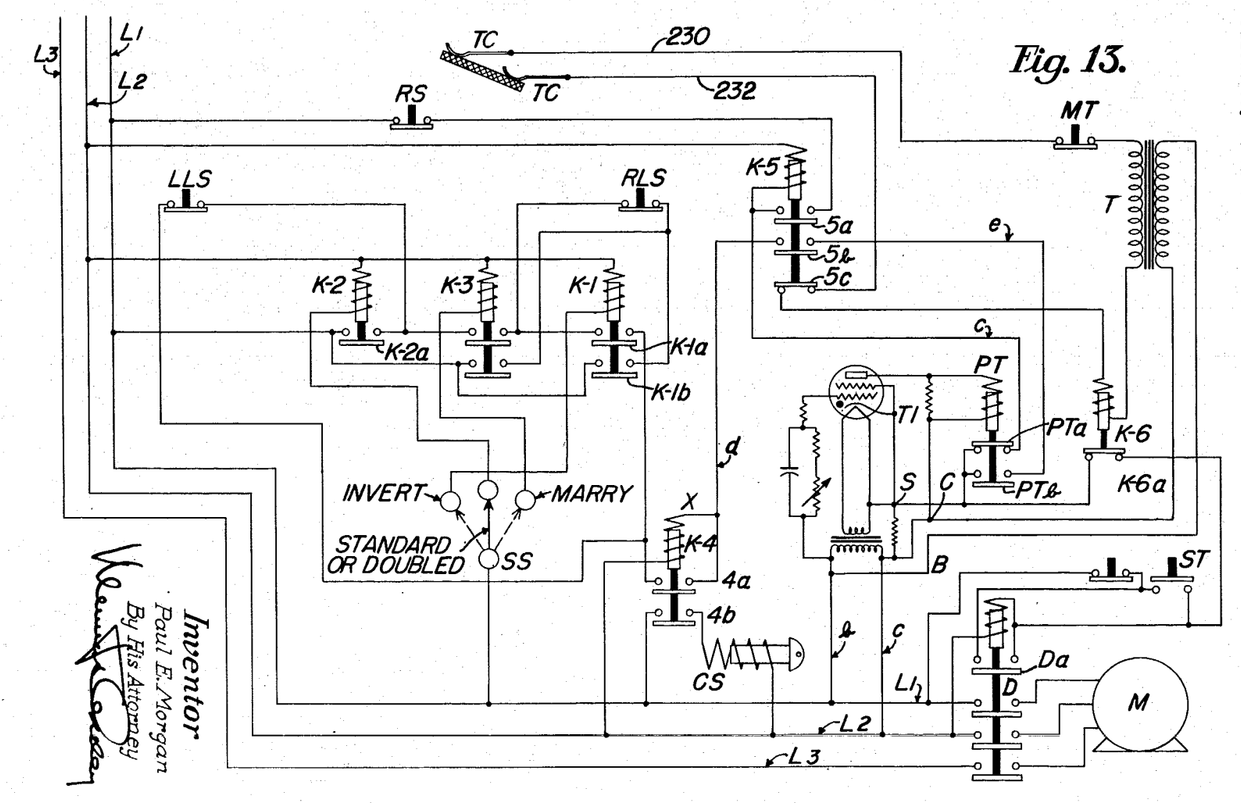
Fig. 13 is a diagrammatic view of the electrical connections for controlling the machine operation.

Fig. 13 diagrammatically sets forth electrical circuits which conveniently may be used in the running of the apparatus. Power is taken from main lines L-1, L-2 and L-3, the circuits being such that, during operation of the machine, the three-phase current passes only to the motor M. In the diagram as drawn the motor M is assumed to be disconnected from the source of power by a main switch and a motor switch and is idle, and all control components are shown in their normal or deenergized positions.

In the circuits, as shown, a timer TI is employed which is commercially available. Such a timer is known as the Promatic Timer and is produced by the General Control Company of Boston, Massachusetts. Such timers are of the electronic type and are built to give accurate timing operation under difficult conditions.

With the main line switch (not shown) closed, the primary of a transformer T is energized from lines L-1 and L-2 by current passing through lines $b$ and $c$. Coil K-6 is energized by current from the secondary of transformer T passing through the contacts MT, 5c and TC. The contact K-6 opens, preventing current flow to the timer TI referred to above which timer is arranged to energize a relay coil PT a predetermined time after application of current from the lines L-1 and L-2 to the terminals S and C respectively. It will be observed that terminal C is permanently connected to the line L-2 by line $c$.

To start the motor M and to operate the conveyor belts the push button ST is momentarily depressed to energize the coil of the relay D and thereby close the three-phase motor circuit. The coil of relay D remains energized through its contact Da after release of the button ST. It is to be understood that when the machine is handling a number of hides or skins the motor M and the conveyor belts run continuously.

For "Doubled" stacking (see Figs. 13, 21, 22 and 23), the selector switch SS is set to "Standard" position and the coil of the relay K-2 is energized to close the corresponding contacts K-2a. When a spread-out work piece, such as a leather side 1A is placed on the constantly running conveyor belt 102 (dot-and-dash line position of belt in Fig. 21) or received thereon from a leather treating machine, it travels upwardly and its leading edge opens the contacts TC with the result that coil of relay K-6 is deenergized and its contacts K-6a are closed, so that current from L-1 passes to the terminal S of the timer coil PT and to the coil of relay K-5 through contacts PTa. The timer TI begins to measure a predetermined time interval and at the same time coil K-5 is energized to close the contacts 5a and 5b, shown open in Fig. 13. Contacts 5a open and maintain the coil K-6 deenergized with voltage retained on the terminal S of the timer PT regardless of the opening or closing of contacts TC after the initial break.

The aforesaid time interval having elapsed permitting the leading edge of the work piece to contact the left end of the stack as seen in Fig. 21, the contact PTa of the timer coil PT (normally closed as in Fig. 13) opens so that coil K-5 is energized only through the reset switch RS. Contacts PTb close and connect one side X of the coil of relay K-4 to L-1 through contacts 5b of the relay K-5, thereby energizing relay K-4. Contacts 4a are closed to connect side X to L-1 through the limit switch LLS, and contacts 4b are closed to energize a clutch solenoid CS, causing the conveyor arms to travel to the right from the position P (Fig. 21) or toward the front of the machine along the conveyor tracks or horizontal channel bars 24 (see arrow HA in Fig. 1).

When the arms reach positions midway of the track they cause the opening of the reset switch RS thereby deenergizing the coil K-5, contacts 5a open, breaking the holding circuit and contacts 5b open breaking the connection of L-1 to S except through the contact K-6a and breaking the connection of L-1 to X except through the switch LLS. Contacts 5c close so that when contacts TC reclose (the trailing edge of the leather side having passed them), the relay K-6 is energized and the timer TI is deenergized by opening of contacts K-6a removing the last connection of L-1 to S. The delivery arm and belts continue to swing to the extreme forward positions PF (Fig. 22) and then return to positions P at which time the work piece 1A has been completely deposited on the stack and doubled upon itself and the end of the stacking cycle has been reached. At the end of the cycle a projection from one conveyor arm 130 serves to open the switch LLS (striking roller LR in Fig. 3) to deenergize the coil K-4 and open contacts 4b thereby deenergizing the solenoid clutch CS and stopping the swinging of the conveyor arms.

Figure 14:
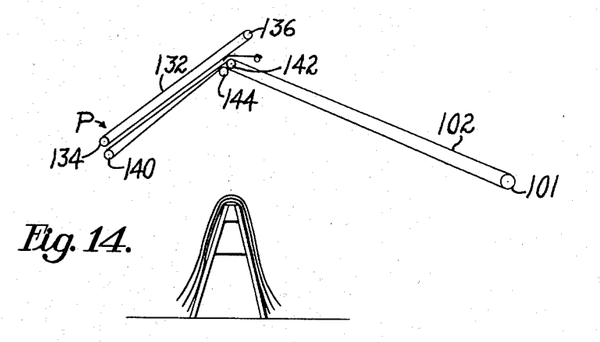
Figs. 14, 15 and 16 are diagrammatic representations of the different stages of a "Standard" stacking operation.
Figure 15:
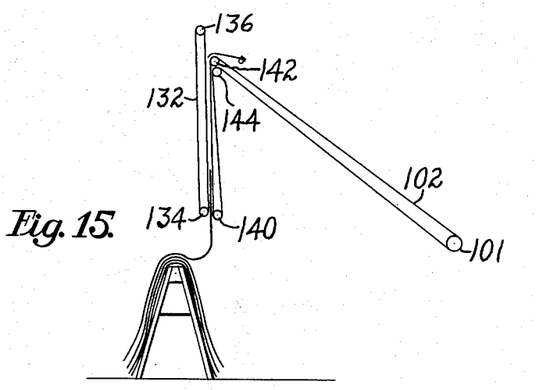
Figure 16:
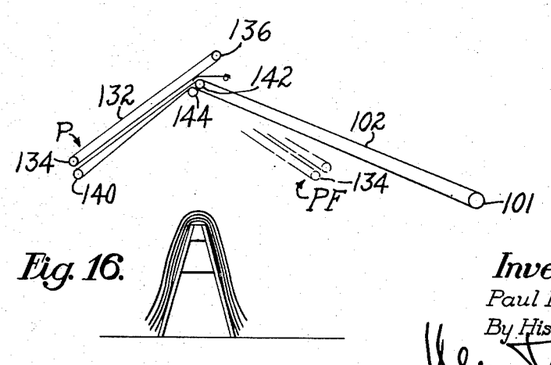
Figure 17:
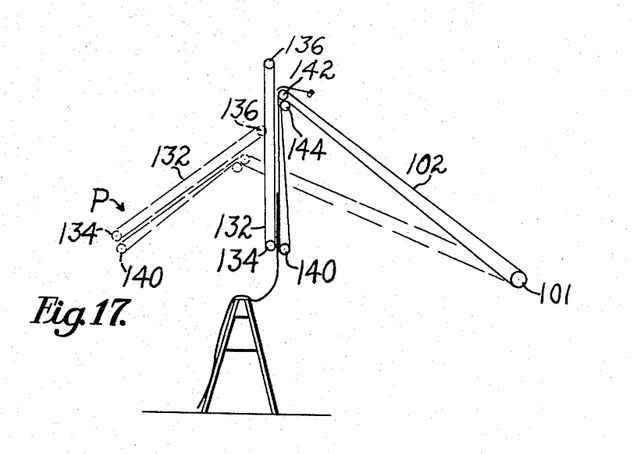
Figs. 17, 18 and 19 diagrammatically illustrate three stages of operation for "Marry" stacking.
Figure 18:
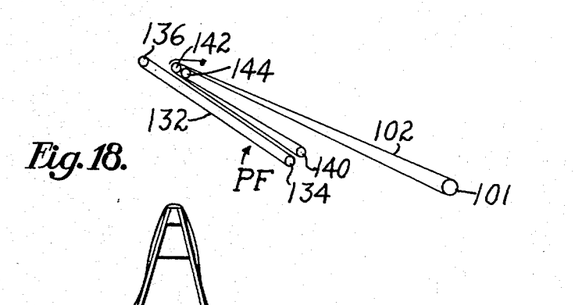
Figures 19, 20:
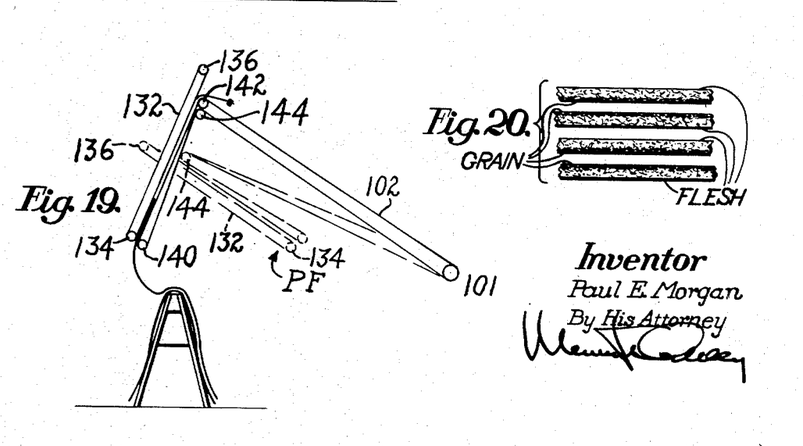
Fig. 20 is a sectional and exploded view illustrating what is meant by "Marry" stacking.

After a number of such cycles (five completed as in Fig. 23), that number of sides or work pieces have been stacked and doubled upon themselves (if of sufficient length) with their loose ends placed substantially together or directed towards the same side of the support for the stack. Up to this point, the operation of the machine is the same whether the stacking be Standard for calf skins (as depicted in Figs. 14, 15 and 16) or Doubled for side leather, the only difference being that in Standard stacking for calf skins (relatively smaller work pieces) the conveyor belts and arms return to their positions P as an idle or empty stroke in each cycle—whereas, in Doubled stacking for side leather (relatively long work pieces) the return stroke is not idle but serves to lay down the remaining undeposited portion of each work piece.

Figures 22, 23:
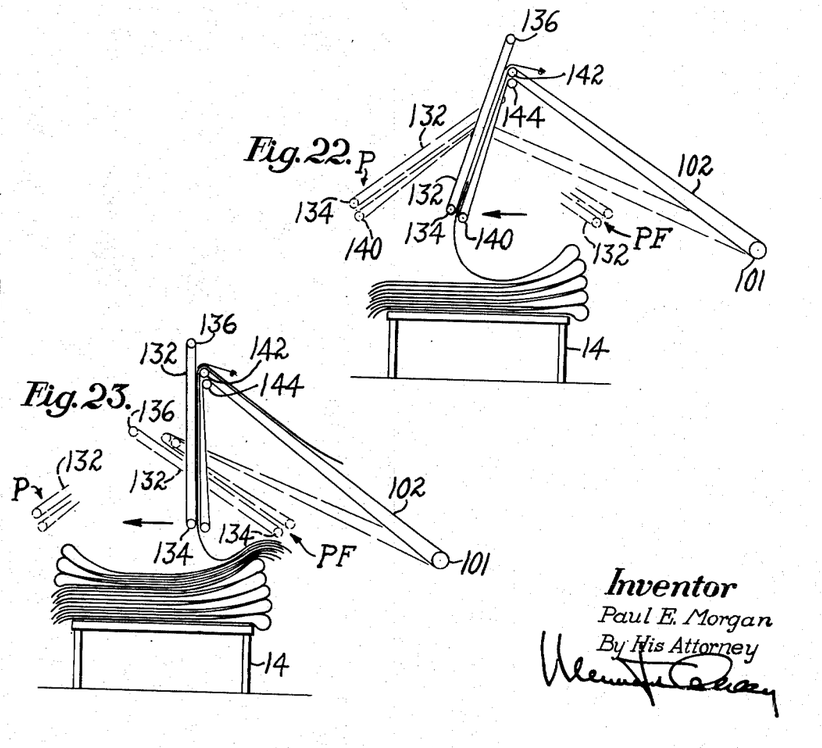

Continuing with a description of the Doubled stacking of Figs. 21, 22 and more specifically in Fig. 23, it may be seen that a reverse order of Doubled stacking is desirable after a certain number of work pieces have been doubled or stacked. After a number of pieces (such as five in Fig. 23) have been stacked the operator shifts the selector switch SS to Invert position upon which the limit switch RLS serves in place of the limit switch LLS to deenergize the coil K-4. Consequent reversal of the delivery arm direction restores balance to the stack and prevents displacement of the work after it is deposited.

For Marry stacking (Figs. 17 to 20) the electrical sequence is the same except that the relay K-3 is brought into play by setting the selector switch SS to "Marry" to cause both limit switches LLS and RLS to be operative, and to cause the timer TI to function at the beginning of each sweep of the conveyors as a separate work piece is laid down. As a consequence the work pieces are stacked with alternate pieces having their flesh side up and the other pieces with their grain sides up.

Three forms of stacking are specifically referred to herein but it is obvious that the machine may be used to carry out modified versions or combinations of these forms to secure different stacking to satisfy particular requirements.

Having described my invention, what I claim as new and desire to secure by Letters Patent of the United States is:

1. A machine for conveying a dielectric work piece in sheet form such as a hide or skin comprising a flexible conveyor belt of a dielectric material, a discharge portion of said belt being located over a zone in which a work piece is to be placed, means for moving said discharge portion over said zone, electrically conductive material on said belt, detector means normally in yielding contact with said conductive material, and means including an electrical circuit connected in series with said conductive material and said detector means for controlling said moving means, the arrangement being such that when the circuit is broken by a work piece conveyed between the conductive material and the detector means by the belt, the moving means are activated by said circuit to move the discharge portion in proper time relation to the movement of the work piece thereby properly locating the work piece in said zone.

2. A machine for conveying a dielectric work piece in sheet form such as a hide or skin comprising a flexible conveyor belt of a dielectric material, a discharge portion of said belt being located over a zone in which a work piece is to be placed, means for moving said discharge portion over said zone, electrically conductive material on said belt, detector means normally in yielding contact with said conductive material, and means including an electrical circuit having a time delay therein connected in series with said conductive material and said detector means for controlling said moving means, the arrangement being such that when the circuit is broken by a work piece conveyed between the conductive material and the detector means by the belt, the moving means are activated by said circuit after a time delay to move the discharge portion in proper time relation to the movement of the work piece thereby properly locating a work piece in said zone.

3. A stacking machine for sheet materials introduced at random having, in combination, a main frame, a delivery arm pivotally connected to one end of said main frame at a pivot point, a main conveyor having a first run extending along the upper surface of said frame and around a roll concentric with said pivot point and a second run extending downwardly along said delivery arm, a delivery arm conveyor having a run which is parallel to and contiguous with the second run of said main conveyor, means for driving said conveyors whereby workpieces are carried along said frame and then downwardly between said contiguous runs, means for moving the lower end of said delivery arm across a work receiving zone, and means operative in response to the passage of a workpiece for actuating said delivery arm moving means so that each workpiece will be properly disposed in said zone.

4. A stacking machine for sheet materials introduced at random having, in combination, a main frame inclined upwardly, a delivery arm pivotally connected to the upper end of said main frame at a pivot point, a main conveyor having a first run extending upwardly along said frame and around a roll concentric with said pivot point and a second run extending downwardly along said delivery arm, a delivery arm conveyor having a downward run extending above the first run of the main conveyor and in parallel and contiguous relation to said second run of the main conveyor, means for driving said conveyors whereby workpieces may be carried upwardly to said pivot point and then downwardly between said contiguous runs, means for moving the lower end of said delivery arm across a work receiving zone, and means operative in response to the passage of a workpiece for actuating said delivery arm moving means so that each workpiece will be properly disposed in said zone.

5. A stacking machine for sheet materials introduced at random having, in combination, a main frame inclined upwardly, a delivery arm pivotally connected to the upper end of said main frame at a pivot point, a main conveyor having a first run extending upwardly along said frame and around a roll concentric with said point and a second run extending downwardly along said delivery arm, a delivery arm conveyor having a run which is parallel to and contiguous with the second run of said main conveyor, means for driving said conveyors whereby workpieces are carried upwardly and then downwardly between said contiguous runs, means for moving the lower end of said delivery arm in a predetermined, intermittent cycle of operation across a work receiving zone, and means operative in response to the passage of a workpiece for actuating the cyclic operation of the delivery arm moving means so that each workpiece will be properly disposed in said zone.

6. A stacking machine for sheet materials introduced at random having, in combination, a main frame inclined upwardly, a delivery arm pivotally connected to the upper end of said main frame at a pivot point, a main conveyor having a first run extending upwardly along said frame and along a roll concentric with said point and a second run extending downwardly along said delivery arm, a delivery arm conveyor having a run which is parallel to and contiguous with the second run of said main conveyor, means for driving said conveyors whereby workpieces are carried upwardly and then downwardly between said contiguous runs, means for moving the lower end of said delivery arm across a work receiving zone in a predetermined, intermittent cycle of operation, means for varying said cyclic operation, and means operative in response to the passage of a conveyed workpiece for actuating the cyclic operation of the delivery arm moving means so that each workpiece will be properly disposed in said zone.

7. A stacking machine for sheet material introduced at random having, in combination, a main frame inclined upwardly and pivotally connected to a fixed support at its lower end, a delivery arm pivotally connected to the upper end of said main frame at a pivot point, a fixed horizontal guide in which is constrained a roll fastened to the lower end of said delivery arm, a main conveyor having a first run extending upwardly and around a roll concentric with said pivot point and a second run extending downwardly along said delivery arm, a delivery arm conveyor having a run extending downwardly in parallel and contiguous relationship to said second run of the main conveyor, means for moving the lower end of said delivery arm across a work receiving zone with a straight line motion as determined by said fixed guide, means for driving said conveyors whereby workpieces may be carried upwardly to said pivot point and then downwardly along said delivery arm, and means operative in response to the passage of a workpiece for actuating said delivery arm moving means so that each workpiece will be properly disposed in said zone.

8. A stacking machine for sheet material introduced at random having, in combination, a main frame inclined upwardly and pivotally connected to a fixed support at its lower end, a delivery arm pivotally connected to the upper end of said main frame at a pivot point, a fixed horizontal guide in which is constrained a roll fastened to the lower end of said delivery arm, a main conveyor having a first run extending upwardly and around a roll concentric with said pivot point and a second run extending downwardly along said delivery arm, a delivery arm conveyor having a run extending above said upward run of the main conveyor and downwardly in parallel and contiguous relationship to said second run of the main conveyor, means for moving the lower end of said delivery arm across a work receiving zone with a straight line motion as determined by said fixed guide, fixed switches at each end of said guide and an electrical circuit incorporating said switches for establishing cyclic operation of said delivery arm moving means, a control switch in said circuit for varying the cycle of operation of the delivery arm moving means, means for activating said conveyors whereby workpieces are first carried upwardly and then downwardly between said contiguous runs, and means operative in response to the passage of a workpiece for actuating the cyclic operation of the delivery arm moving means so that each workpiece will be properly disposed in said zone.

References Cited in the file of this patent

UNITED STATES PATENTS

| Number | Name | Date |
| --- | --- | --- |
| 935,538 | North | Sept. 28, 1909 |
| 1,376,942 | Kelley | May 3, 1921 |
| 1,823,078 | Addler | Sept. 15, 1931 |
| 1,879,990 | Oles | Sept. 27, 1932 |
| 2,218,062 | Yates | Oct. 15, 1940 |
| 2,250,572 | Cumfer | July 29, 1941 |

FOREIGN PATENTS

| Number | Country | Date |
| --- | --- | --- |
| 852,898 | France | Mar. 5, 1940 |